Feb. 28, 1967 C. E. WELLER ET AL 3,307,099

MICROWAVE FREQUENCY MULTIPLIER COMPRISING SIDE BY SIDE RESONATORS WITH VARACTORS CONTAINED IN ONE RESONATOR

Filed Dec. 23, 1964

INVENTORS.
CARROLL E. WELLER
MICHAEL RADEKE
BY
Alden D. Redfield
Charles M. Hogan
ATTORNEYS.

3,307,099
MICROWAVE FREQUENCY MULTIPLIER COMPRISING SIDE BY SIDE RESONATORS WITH VARACTORS CONTAINED IN ONE RESONATOR

Carroll E. Weller and Michael Radeke, both of Cincinnati, Ohio, assignors to Avco Corporation, Cincinnati, Ohio, a corporation of Delaware Filed Dec. 23, 1964, Ser. No. 420,574
4 Claims. (Cl. 321—69)

Figures 1, 2:
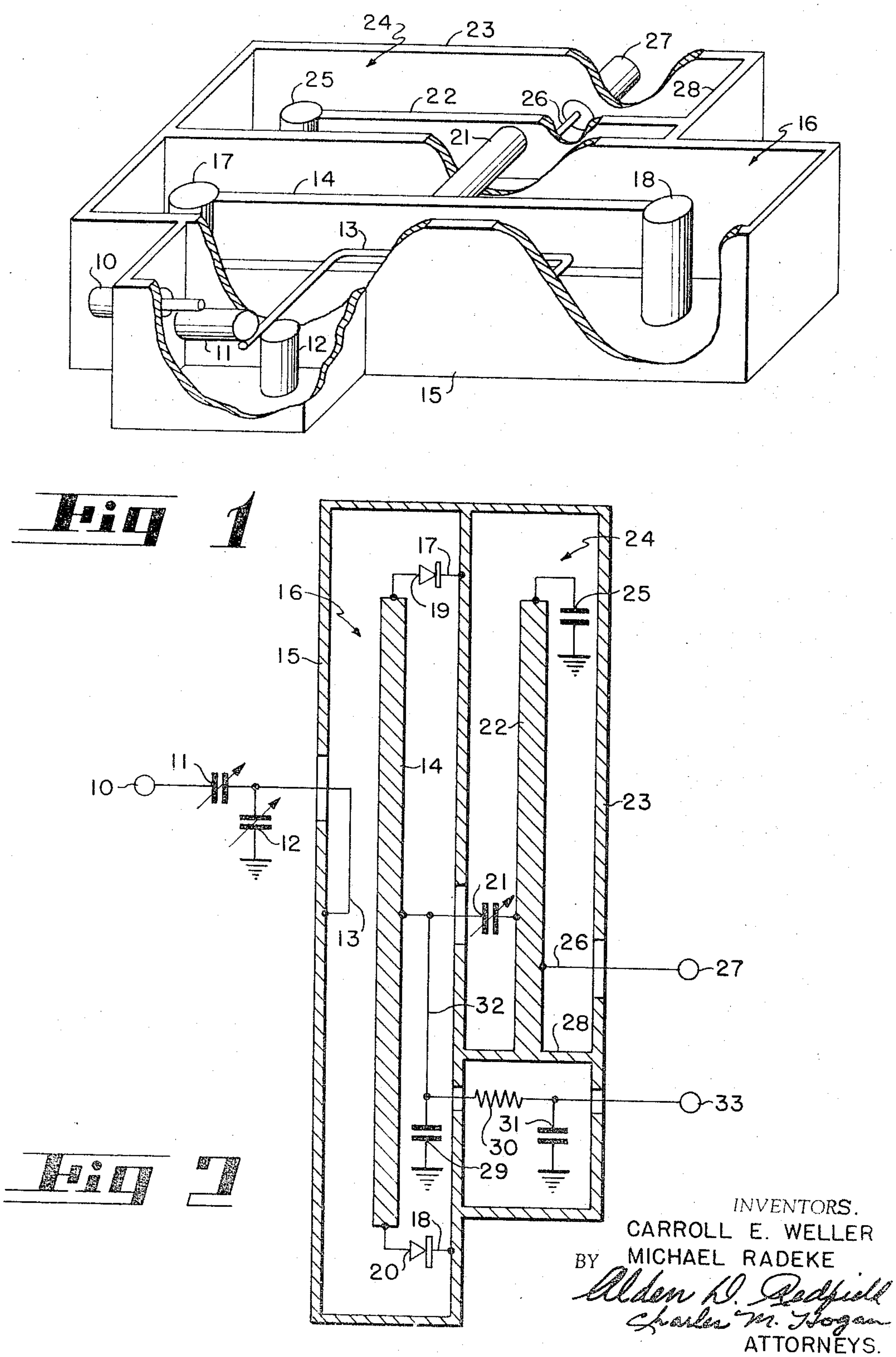

The present invention relates to microwave frequency multiplication, and particularly to an improved distributed parameter frequency doubler.

It is an object of the invention to provide a TEM mode transmission line device offering improved frequency doubler characteristics in the UHF (ultra-high-frequency) and higher frequencies.

Another object of the invention is to provide a device of the character described featuring magnetic coupling to the input and electrical coupling from the output.

For a better understanding of the present invention, together with other and further objects, advantages, and capabilities thereof, reference is made to the following description of the appended drawings, in which:

FIG. 1 is a perspective view of a preferred embodiment of distributed parameter frequency doubler in accordance with the invention; and FIG. 2 is a circuit schematic of the FIG. 1 frequency doubler.

The microwave frequency power (of, say, 576 megacycle frequency) enters the device through the input coaxial connector 10 and a network tuned for maximum power transfer by a variable capacitor 11 in series, a variable capacitor 12 in shunt to ground, and a magnetic coupling loop 13. This power is coupled, through the electromagnetic field produced by the magnetic coupling loop 13, to the central conductor 14 of a transmission line. This transmission line operates in the TEM mode and consists of a center conductor 14, an outer conductor 15, and an intervening dielectric 16. The center conductor 14 is supported by two dielectric varactor diode holders 17 and 18, the diodes being referred to by the reference numerals 19 and 20. The varactor diodes are physically connected from the ends of the center conductor 14 to the outer conductor 15. The length of the center conductor 14 is determined by the quiescent operating capacity of the varactor diodes 19 and 20.

A varactor diode has a non-linear capacity which depends on the reverse voltage across it. The average value of this voltage depends on the aggregate effects of self-bias and external bias circuitry. This average is varied at a microwave frequency rate by the voltage produced by the energy coupled to the center conductor 14. The effect of varying the varactor non-linear capacity at a microwave frequency is to produce harmonics across the varactor diodes. The harmonic of largest magnitude is the second harmonic, say 1152 megacycles. Due to the balanced configuration of the center conductor 14 with respect to the varactor diodes 19 and 20, and due to the magnetic energy coupling, the point midway between the varactor diodes on the center conductor 14 is a null point for the input frequency and its odd harmonics, but this is a maximum point for the even harmonics.

The second harmonic energy is coupled electrically by the variable capacitor 21 to the center conductor 22 of the cavity which comprises the center conductor 22, the outer conductor 23, and the dielectric 24.

This second cavity, in conjunction with the capacitor 21 and the capacitor 25, is tuned to pass the second harmonic and to reject the other harmonics. The output tap 26 couples the second harmonic from the center conductor 22 to the output coaxial cable 27. The capacitor 21, the output tap 26, and the short circuit 28 are located on the center conductor 22 in order to obtain maximum power transfer at the output frequency (1152 megacycles).

The dielectric material for 16 and 24 may be air, foam, or inert gas, for example.

It will be understood that the inventive structure comprises a pair of resonators, housed side by side and closed by a suitable metallic lid member (not shown). Each of the two resonators is essentially a quarter-wave line, as loaded, the line comprising the elements 14 and 15 resonating at the fundamental or input frequency, and the line comprising the elements 22 and 23 resonating at the second harmonic frequency. In each resonator standing waves are accordingly set up.

Mechanically, the central conductors 14 and 22 are in the form of metallic bars.

While in the preferred embodiment of the present invention the elements disposed between the inner and outer conductors are varactors 19 and 20, it will be understood that any voltage-sensitive non-linear capacity or solid state device may be substituted for each of the varactors.

This invention represents a substantial step forward in the art, in that it extends symmetrical doubling into the higher frequency ranges at which distributed parameters are employed.

The filter network comprising series resistor 30, shunt capacitors 29 and 31, and conductor 32 is connected to a current or energy source at 33 and electrically connected to the varactors, via conductor 32, in order to provide bias for the varactors. A radio frequency choke may be inserted in line 32, if desired, to increase isolation and improve the filtering action.

Thus it will be seen that the invention provides a frequency multiplier having distributed parameters, comprising: a first resonator consisting of a coaxial line having a first outer conductor and a first central conductor and a dielectric therebetween; means comprising a varactor connected between each end of said central conductor and said outer conductor; a second resonator comprising a second outer conductor and a second central conductor and a dielectric therebetween; means magnetically coupled to the first central conductor for exciting the first resonator at a fundamental frequency, thereby to establish standing waves and to cause the varactors to generate harmonics; and means electrostatically coupling a null point on the first central conductor to the second central conductor to excite said second resonator at the second harmonic of the fundamental excitation frequency.

While there has been shown and described what is at present considered to be the preferred embodiment of the invention, it will be understood by those skilled in the art that various modifications and changes may be made therein without departing from the proper scope of the invention as defined in the following claims. For example, frequencies mentioned herein are illustrative and not limiting.

We claim:

1. A frequency multiplier having distributed parameters, comprising:
a first resonator consisting of a coaxial line having a first outer conductor and a first central conductor and a dielectric therebetween;
varactors connected between the ends of said first central conductor and said first outer conductor;
a second resonator comprising a second outer conductor and a second central conductor and a dielectric therebetween;
means magnetically coupled to the first central conductor for exciting the first resonator at a fundamental frequency, thereby to establish standing waves and to cause the varactors to generate harmonics;

and means electrostatically coupling a null point on the first central conductor to the second central conductor to excite said second resonator at the second harmonic of the fundamental excitation frequency.

2. A frequency multiplier having distributed parameters, comprising:

a first resonator consisting of a coaxial line having a first outer conductor and a first central conductor and a dielectric therebetween;

voltage-sensitive non-linear capacitor means connected between said first central conductor and said first outer conductor;

a second resonator comprising a second outer conductor and a second central conductor and a dielectric therebetween;

means magnetically coupled to the first central conductor for exciting the first resonator at a fundamental frequency, thereby to establish standing waves and to cause the capacitor means to generate harmonics;

and means electrostatically coupling a null point on the first central conductor to the second central conductor to excite said second resonator at the second harmonic of the fundamental frequency.

3. A frequency multiplier having distributed parameters, comprising:

a first resonator consisting of a coaxial line having a first outer conductor and a first central conductor and a dielectric therebetween;

varactors connected between the ends of said first central conductor and said first outer conductor;

a second resonator comprising a second outer conductor and a second central conductor and a dielectric therebetween;

means coupled to the first central conductor for exciting the first resonator in the TEM mode and at a fundamental frequency, thereby to establish standing waves and to cause the varactors to generate harmonics;

and means electrostatically coupling a null point on the first central conductor to the second central conductor to excite said second resonator at the second harmonic of the fundamental excitation frequency.

4. A frequency multiplier having distributed parameters, comprising:

a first resonator consisting of a coaxial line having a first outer conductor and a first central conductor and a dielectric therebetween;

varactors connected between the ends of said first central conductor and said first outer conductor;

a second resonator comprising a second outer conductor and a second central conductor and a dielectric therebetween;

means magnetically coupled to the first central conductor for exciting the first resonator at a fundamental frequency, thereby to establish standing waves and to cause the varactors to generate harmonics;

and means electrostatically coupling a null point on the first central conductor to the second central conductor to excite said second resonator at the second harmonic of the fundamental excitation frequency, said outer conductors being portions of a common housing.

References Cited by the Examiner

UNITED STATES PATENTS

| | | | |
|---|---|---|---|
| 2,982,922 | 5/1961 | Wilson | 331—76 |
| 3,175,164 | 3/1965 | Schreiner | 330—4.9 |
| 3,267,352 | 8/1966 | Blight | 321—69 |
| 3,277,406 | 10/1966 | Ocker | 333—83 |

JOHN F. COUCH, *Primary Examiner.*

G. GOLDBERG, *Assistant Examiner.*